(No Model.) 3 Sheets—Sheet 1.

G. N. TODD.
COTTON HARVESTER.

No. 510,731. Patented Dec. 12, 1893.

Witnesses.
W. Rossiter.
Will R. Anshundro.

Inventor.
George N. Todd,
By Jno. G. Elliott,
Atty.

THE NATIONAL LITHOGRAPHING COMPANY,
WASHINGTON, D. C.

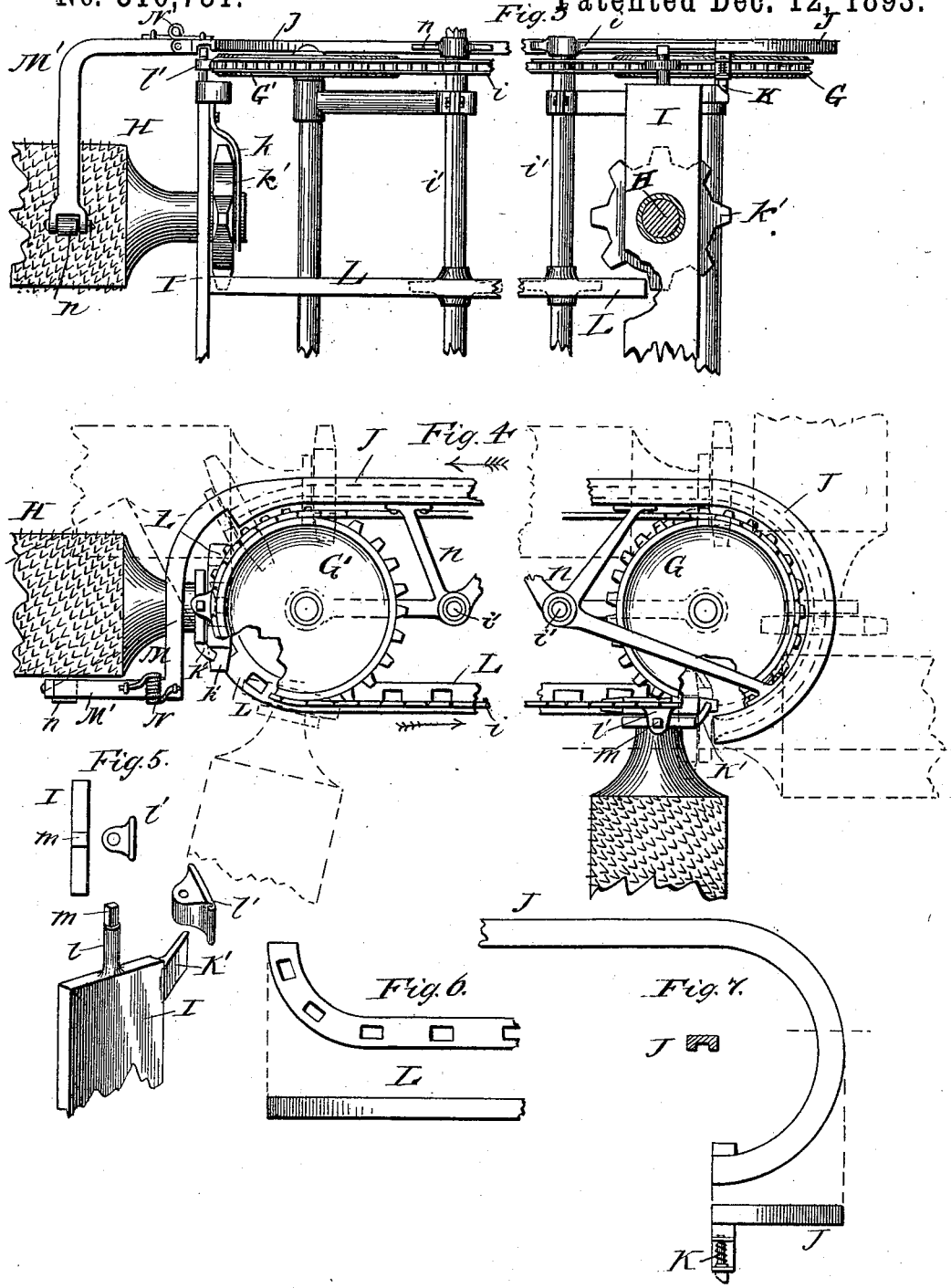

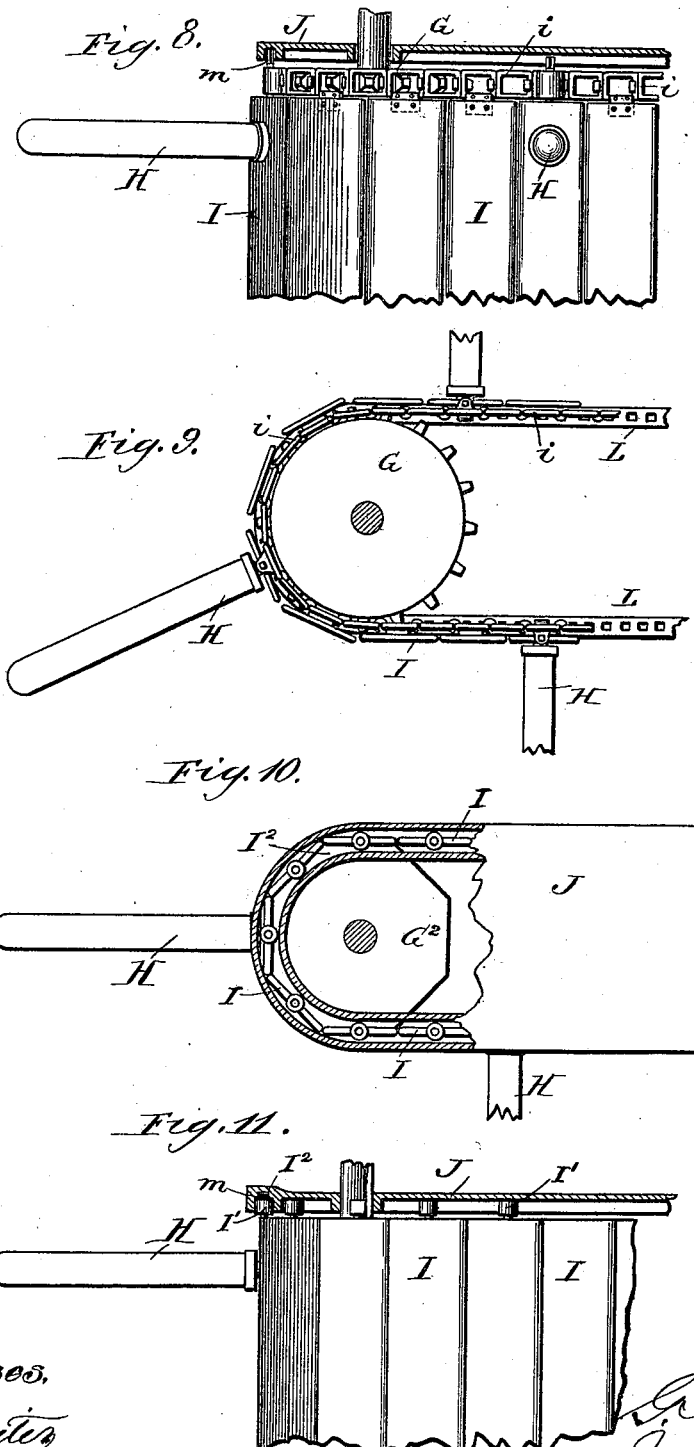

UNITED STATES PATENT OFFICE.

GEORGE N. TODD, OF CHICAGO, ILLINOIS, ASSIGNOR TO THE TODD COTTON HARVESTER COMPANY, OF ILLINOIS.

COTTON-HARVESTER.

SPECIFICATION forming part of Letters Patent No. 510,731, dated December 12, 1893.

Application filed May 9, 1885. Renewed August 19, 1889. Serial No. 321,187. (No model.)

*To all whom it may concern:*

Be it known that I, GEORGE N. TODD, a citizen of the United States, residing in Chicago, county of Cook, and State of Illinois, have invented certain new and useful Improvements in Cotton-Harvesters, of which the following is a specification.

This invention relates to improvements in cotton harvesters in which cotton-picker stems are employed, having an axial movement of their own, and in addition are revolved about a fixed axis, as is fully described in Letters Patent No. 423,885, granted me on the 18th day of March, 1890, which stems by reason of their revolving on a fixed axis move backward through a cotton bush with the same velocity as the forward travel of the machine.

In the machine referred to it is found that by reason of the picker-stems revolving about a single axis, they move through the cotton bush too rapidly and with such resistance to the bush owing to their entering the same at the sides, and at a right angle to the travel of the machine, that all of the cotton is not picked.

The objects of this invention are to avoid this objection by having picker stems revolve on their own axes and to travel backward in a line with the machine so that in effect their backward travel maintains them substantially at a standstill with reference to the advance of the machine, and by this means cause the picker stems in effect to remain revolving in the same place in the bush a sufficient length of time to enable it to effectively remove ripe cotton without injuring the boll or bush.

A further object is to provide such rotating picker stems as enter the bush at right angles to the travel of the machine and move backwardly as fast as the machine moves forward, with means for shifting the stems when clear of the bushes to a position best adapted to facilitate the removal of the cotton accumulated on the picker-stems, and protect the picker-stems from injury when out of the bush, at the same time permit the machine to be constructed of a minimum width so that when straddling one row of cotton bushes it will clear the adjacent rows, and finally to promote the effectiveness of the machine as a whole by means of certain details of construction hereinafter described.

I attain these objects by devices illustrated in the accompanying drawings, in which—

Figure 1:
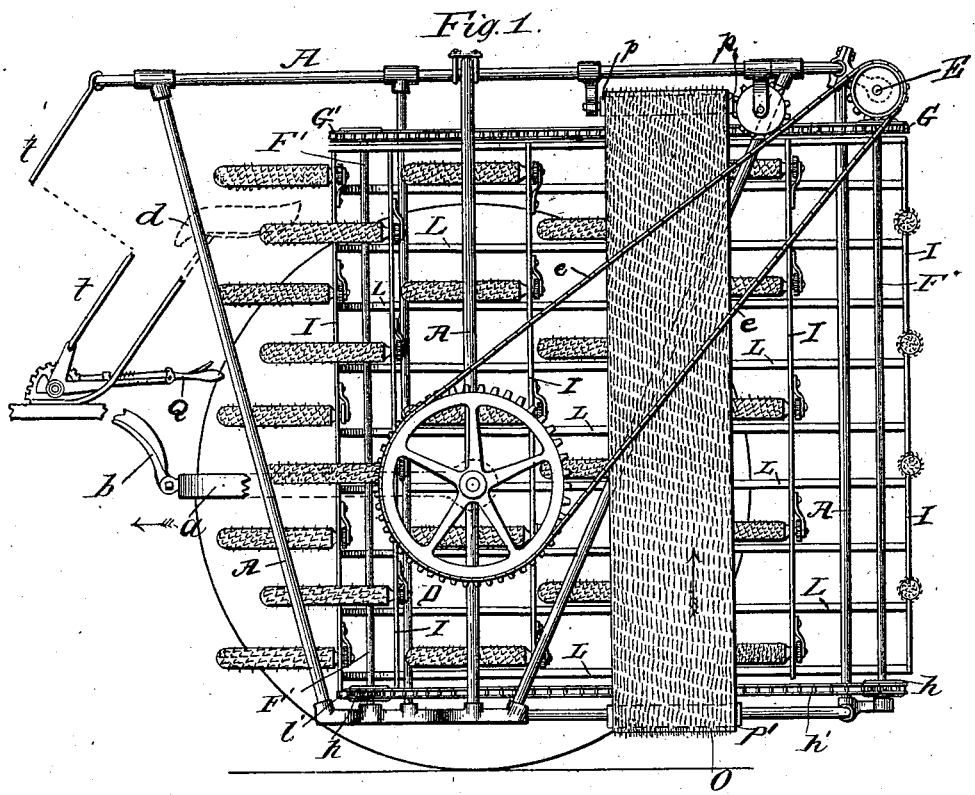
Figure 2:
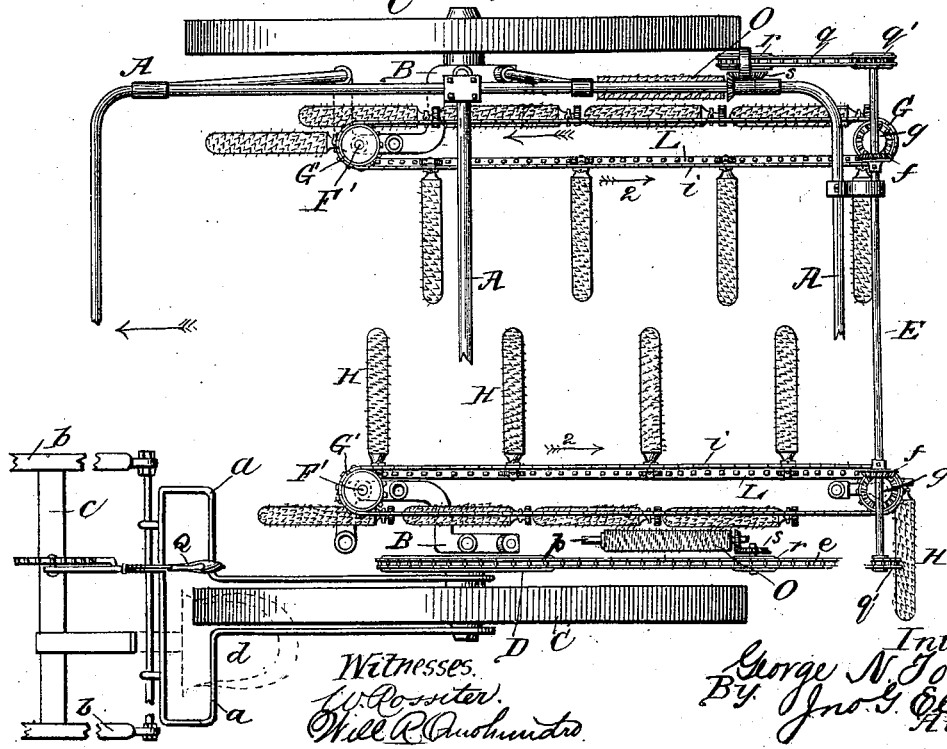

Figure 1, represents a side elevation of a machine embodying my invention, and having the wheel on that side removed. Fig. 2, is a plan view of the same with a portion of the upper frame broken away; Fig. 3 an enlarged detail side view; Fig. 4 a plan of the devices shown in Fig. 3 with parts of the sprocket wheel broken away to show the rack, prior to the picker-stem engaging the same, and a picker-stem entering the grooved guide-way at the opposite end of the machine, with dotted lines indicating the various positions assumed by the picker-stems as they travel with the sprocket chains. Fig. 5 is a detail view of the bearings and housings for the picker-stems; Fig. 6, a detail side elevation and plan view of a section of the rack-bar; Fig. 7, a plan view, transverse section, and side elevation of the guide-way, the latter view showing the spring stop for swinging a picker stem from a line at a right angle to a line parallel to its general direction of travel, and just after its escape from the grooved guide way; Fig. 8, a detail elevation partly in section showing a modified construction of my endless belt; Fig. 9, a plan view thereof; Fig. 10, a similar view of a second modification of the same, and Fig. 11, a side elevation thereof.

Similar letters of reference indicate the same parts in the several figures of the drawings.

The frame of this machine is preferably constructed of a number of tubes or rods A, which are supported from and connect the two axles B, which in turn are supported by wheels C, separated sufficiently to straddle a row of cotton bushes,—without disturbing those of the adjacent rows. This frame constitutes an arch connecting the axles, and supporting the operative parts of the machine, a side draft to which, is obtained by a yoke *a*, (see Fig. 2,) secured to the axle and having swiveled thereto the shafts *b*, from a transverse bar *c* on which projects rearwardly the driver's seat, *d* shown in dotted lines in Figs. 1 and 2. Rigid upon one of the wheels, hubs or spokes is a large sprocket wheel D, from which, power is communicated to a transverse horizontal shaft E, on the upper and toward the rear end of the machine by a link-belt *e*. This shaft E, carries two beveled gears, *f*—one at each side of the machine—meshing with similar gears —*g*— on the upper ends of vertical shafts F, which at their lower ends are connected with similar vertical shafts F', at the forward end of the machine by sprocket wheels *h* and link-belt *h'*. (See Fig. 1.) On the upper ends of the two pairs of opposing shafts F, F', are respectively sprocket wheels G, G', (see Figs. 3 and 4) connected by link-belts *i* actuated to revolve the vertical shafts by the mechanisms before described.

The picker stems H, which may be of any desired construction are carried by a series of slats I, (see Figs. 1 and 3,) in which slats four (more or less) of these picker-stems have bearings by having their journal ends projected through the slats, a sufficient distance to give them an additional bearing in bracket-plates *k* bolted to the slats, between which and the slats, and rigid upon the journals of the picker stems are gears *k'*, by means of which and through the medium of a rack hereinafter described, the picker-stems are caused at intervals, (during their contact with the cotton bush) to revolve upon their own axes. At their upper ends (see Fig. 5), the slats I, are provided with cylindrical pintles *l* which have bearings in, and project through small castings *l'*, which are secured to the sprocket chains *i*, so that said slats may oscillate on their axes. At their lower ends these slats are connected in the same manner as above described, to the link-belts *h'*, but do not project through the castings *l'*. The projecting upper ends of the pintles *l*, are squared as shown at *m*, Fig. 5, and extend sufficiently beyond the outside of the sprocket wheels G, G', to engage at intervals with grooved tracks or guideways J, shown in detail in Fig. 7, and in the manner hereinafter described, which tracks are supported by arms *n*, (see Figs. 3 and 4,) rigid upon uprights *i'* of the frame. (See Fig. 3.)

Grooved guide ways J, are supported outside of the sprocket wheels G, G', and extend partially around to the inner sides of the rear sprockets G, as shown in Fig. 4, and carry on their under sides at their inner ends a spring actuated latch K, (see Fig. 7,) which latch engaging with the projection K', on the slats (see Figs. 4 and 5), just before the engagement of the squared end *m* of the slat journal with the guideway and swings the slat, and with it the picker stem from the position shown in full lines at the lower right hand corner of Fig. 4, to the position shown in dotted lines, so that the picker-stem will be swung to the position shown in dotted lines and shift its position as indicated by dotted lines during the time the slat is in engagement with the grooved track, and carried around the sprockets by the link belts.

The purpose in shifting the position of the picker stems, after having passed through a cotton bush, is mainly to cause them to travel outside of the sprocket wheels in a line parallel with the track, and enable a corresponding reduction of distance between the wheels supporting the structure and at the same time have said picker stems, first enter a cotton-bush at substantially an oblique angle to the line of travel of the machine. Another purpose however is to afford the best protection possible to the picker stems after they have passed out of the bush, and maintain them in a position at which they may be readily and conveniently wiped and relieved of their load, before again entering the cotton bushes, as hereinafter described.

To revolve the picker-stems on their own axes when in contact with the cotton bush, their gears *k'* are engaged with rack-bars L, (see Figs. 1, 2, and 4,) which are arranged in differing planes corresponding with the picker stems in the same plane, which rack-bars extend along the inside of the sprocket-wheels, and in a line coincident with the link belts, and are curved outwardly on the same line to a point outside of a line drawn through the axes of the sprockets G, G', to a point near the forward end of the grooved guide-way.

With the understanding that the picker-stems are not revolved on their own axes when in engagement with the grooved guide-way, it will be seen by reference to Fig. 4, that when the picker-stems have passed out of the forward end of the guide-way, they will engage with the rack, and be revolved on their own axes while in a line of coincidence with the line of travel of the machine, so that as they are swung around inwardly to a line at a right angle with the line of travel of the machine they will continue to be revolved and enter the bush on an oblique angle gradually increasing to a right angle with the row of bushes. In actual use the entering of a picker stem to a cotton bush in this manner is found to be the most practical, for the reason that it is less liable to injure the bush or bolls, and that it gradually raises up out-spreading-limbs in such a manner that they are dragged over the picker stem in the most effective way for engaging the stem with the ripe cotton without injury to the bolls.

After the picker-stem slats pass out of the grooved guide way at the forward end of the machine, the slats are for a short interval free to turn or swing on their own and consequently a vertical axis, carrying with them the picker stems to the position shown in full lines at the left of Fig. 4, to engage the gears of the picker-stems with their respective racks, and before said picker stems come in contact with the cotton bush.

As a simple and effective means for swinging the slat and picker-stems, as above described, a bent arm M, is secured to the grooved guide ways or some other fixed portion of the frame, to which is hinged, (see Fig. 4,) an arm M', normally maintained by a spring N', in a position to afford sufficient resistance to the picker stem to swing it and the slat during the interval above referred to. The tension of the spring N, is such however that after the picker-stem has engaged with the rack, the resistance of the arm M′, is overcome, and is swung on its hinge out of the way of the picker-stem, and then assumes its normal position ready for the next picker stem. The arm M′ is provided with an anti-friction roller u more clearly shown in Fig. 4, for the purpose of decreasing its friction on and injury to the teeth of the picker stem, and as shown in the same figure, this arm may be angular instead of straight.

In operation the machine straddles a row of cotton bushes and is advanced in the direction indicated by the arrow 1, in Fig. 2, causing the picker-stems during their engagement with the bush to travel in the opposite direction as indicated by the arrows 2, until they reach the rear end of the machine at which point they enter the grooved guide way, and are swung upon the axes of their supporting slats as has been fully described. Mechanically the picker-stems travel backwardly as the machine moves forward, but with relation to the cotton bushes, the picker-stems by this compound movement are otherwise than their revolution on their own axes at a standstill with relation to the bush, so that several opposing stems enter and pick the cotton from the bush, while the following stems take the next bush in advance, and by this means among other advantages attained, the bushes are not bent and strained and otherwise injured as they would be if the picker stems were forcibly drawn through them.

In the operation of gathering the cotton the picker stems enter the bush on substantially a semi-circular line, that is to say, they travel from the forward and outside portion of the plant, in toward the center, and thence outwardly at the rear thereof, the forward travel of the machine combined with the lateral and rearward travel of the picker stems, serving to cause the stems to traverse substantially a cycloidal path and hence in their first engagement with the bush, the picker stems gather the cotton on that side of the bush next the stems, then the cotton toward the center of the bush, and next, the cotton at the rear end and side of the bush so that by the time the picking-stems on each side of the bush have entered and passed out on the various angles before described, all of the ripe bolls on whatever part of the bush they may be located, have been in contact with, and had their cotton removed by the picker stems before the picker-stems have passed around the curved portion of the guide way, out of the bush.

To clean the picker-stems of their accumulated load of cotton, I employ an endless belt O, provided with teeth, which belt extends up on each outer side of the machine between the picker stems, and the respective adjacent wheels of the machine, and in close enough proximity to the picker stems to remove the cotton therefrom during the advance of the picker-stems toward the front of the machine. Toothed belt, O, is mounted upon suitable rollers —$p$—$p'$— respectively at the top and bottom of the machine and the upper roller on one side and hence the belt is actuated by means of the main drive chain employed for driving all the operative parts of my machine, connecting the axle of one drive wheel with one end of the cross shaft E, the said chain engaging a sprocket-wheel, $r$, connected by bevel gears, $s$, with said upper roller, $p$, and the belt on the opposite side of the machine being driven by means of a link chain, $q$, passing over sprocket —$q'$— on the end of shaft E, and sprocket-wheels $r'$, connected by bevel gears $s'$ with the roller $p'$ as clearly shown in Figs. 1 and 2. Cotton may be removed from the belt, by any convenient means, well known in the art of cotton picking and it is not deemed necessary to herein illustrate or describe any particular device.

If desirable for the better protection of the plants and to prevent broken twigs, dead leaves, &c., from interfering with the working of the various gears, the space between the slats carrying picker-stems may be filled with a number of slats or equivalent material secured at the tops and bottoms thereof to the drive chains $i$, thus forming an endless apron of slats effectually protecting all gear, and preventing the limbs of the plant from projecting in between the slats and being broken as illustrated in Figs. 8 and 9. These slats in order that they may set closer together to avoid an open space between them in traversing their orbit, should have rounded edges and a lateral edgewise abutment against one another. By reason of this lateral edgewise abutment these slats may be caused to traverse their orbit and the drive sprocket chain $i$, and sprocket-wheels G, G′, may be dispensed with by substituting instead of the said chain and wheel anti-friction rollers I′, loosely secured on the ends of each slat traveling in suitable guide ways I² provided at the top and bottom of the machine. The guide-studs $m$, may be retained working in the groove J, for maintaining the slats, and consequently the stems in their shifted position when out of gear with the rack, or this stud may be employed only on the slats, carrying picker-stems, for these are the only slats that need to be shifted, and in either case a suitable mechanical device of any well-known form may be employed to maintain a uniform distance between the axes of the slats whether shifted at right angles to or in alignment with each other. To cause these slats to traverse their orbit the sprocket wheels G, G′, would be replaced by a suitable disk or disks or a cylinder G², polygonal in cross-section, the sides of which substantially correspond in width to that of the slats, and as the slats all abut against one another, and are held in a fixed relative position to each other, and in their orbit by the rollers on the ends thereof engaging the guide-way any rotation of the said polygonal disks or cylinders would impart a movement to the endless belt of lasts, as illustrated in Figs. 10 and 11. In all other respects the action of these modified constructions would be identical with that of the preferred construction.

It will be readily seen that the picker-stems can remain extended in the same position as when in operation, and yet be readily cleaned by means of an automatic acting toothed belt carrying the cotton direct from the stems to the loading sacks.

In conclusion it may be stated that the machine should be properly balanced on the axles, and that it may be tilted at any desired angle through the medium of lever Q, mounted on the thills and the rod $t$, (see Fig. 1,) extending to the upper part of the frame.

Having described my invention, what I claim, and desire to secure by Letters Patent, is—

1. In a cotton harvester, the combination of two or more vertical belts, means for moving them in a horizontal plane, and revolving fingers carried by said belts for gathering the cotton, substantially as described.

2. In a cotton harvester, the combination of two or more vertical belts carrying picker stems or fingers, means for moving said belts in a horizontal plane in a direction reverse to the forward motion of the machine, and means for simultaneously revolving said stems on their own axes to gather the cotton, substantially as described.

3. In a cotton harvester, a frame, a rack thereon, two or more vertical belts carrying rotary picker stems means for moving said belts in a horizontal plane and a gear connection between said stems and rack, substantially as described.

4. In a cotton harvester, the combination of two or more endless carriers, each traveling about more than one vertical axis, means for moving them in a horizontal plane, and rotable picker stems journaled in said carriers for gathering the cotton, substantially as described.

5. In a cotton harvester, the combination of two or more endless carriers, each traveling in a horizontal plane about more than one vertical axis, picker stems carried thereby, means for moving said carriers in a direction reverse to the forward motion of the machine, and means for simultaneously rotating said stems on their own axes to gather the cotton, substantially as described.

6. In a cotton harvester, the combination with a series of picker stems, of a carrier composed of link driving belts, connected by vertical slats and moving in a horizontal plane, said carriers supporting and moving said stems in a reverse direction to the advance of the machine, and means for simultaneously rotating said stems, substantially as described.

7. In a cotton harvester, the combination with the picker stems and the endless carrier traveling about more than one vertical axis and supporting the picker stems, of a rack bar engaging and rotating said stems on their own axes, just prior to and during their contact with the cotton plants, substantially as described.

8. The combination with the endless carriers, each traveling about more than one vertical axis, and the picker stems, of the slats supporting the picker stems and a pivot connection between the slats and carrier, substantially as described.

9. The combination of the picker stems, the rack bars engaging and actuating said stems, with the endless carrier, the slats thereof, the projection $m$ on said slats, and the grooved guideway, substantially as described.

10. The combination of the picker stems, the slats supporting said stems having pivots and rectangular projections, the endless carriers to which the slats are pivoted, and the grooved guideway engaging with the rectangular projections at intervals, substantially as described.

11. The combination of the carrier chains, the slats pivoted thereto, lateral projections on said slats, the guideway and the spring stop on said guideway engaging at intervals the lateral projections, substantially as described.

12. The combination of the rack bars, the picker stems engaging said rack bars, the endless carriers, the slats pivoted to said carriers and having lateral projections and end projections and supporting the picker stems, the guideway, the latch thereon, the projections engaging said latch and guideway respectively, substantially as described.

13. The endless carriers, the grooved guideway extending along the outer side of the carriers and partially around the rear end of the same, and a rack bar extending along the inner and straight side of the carriers and partially around the front end of the same, in combination with the slats pivoted to the carriers, the picker stems supported by the slats, the gears on the ends of said stems engaging the rack, and devices substantially as described for swinging the slats into engagement with the guideway and the picker stems into engagement with the rack, as and for the purpose set forth.

14. The combination with the rack the endless carrier, the slats and the picker stems, of the spring actuated lever M', substantially as and for the purpose described.

GEORGE N. TODD.

Witnesses:
   JNO. G. ELLIOTT,
   W. W. ELLIOTT.